United States Patent [19]
Nakajima

[11] Patent Number: 5,970,793
[45] Date of Patent: Oct. 26, 1999

[54] ANGULAR VELOCITY SENSOR AND ANGULAR VELOCITY SENSING SYSTEM

[75] Inventor: Fumio Nakajima, Tokyo, Japan

[73] Assignee: Citizen Watch Co., Ltd., Tokyo, Japan

[21] Appl. No.: 08/888,829

[22] Filed: Jul. 7, 1997

[30] Foreign Application Priority Data

Jul. 8, 1996 [JP] Japan ..................................... 8-177845

[51] Int. Cl.$^6$ ..................................................... G01P 9/04
[52] U.S. Cl. ..................................... 73/504.16; 73/504.12
[58] Field of Search ........................... 73/504.16, 504.12, 73/504.13, 504.14, 504.15, 504.04; 310/329, 370, 365, 367

[56] References Cited

U.S. PATENT DOCUMENTS

| | | | |
|---|---|---|---|
| 5,329,816 | 7/1994 | Soderkvist et al. ................... | 73/504.16 |
| 5,388,458 | 2/1995 | Weinberg et al. .................... | 73/504.16 |
| 5,420,548 | 5/1995 | Nakajima .............................. | 73/504.16 |
| 5,578,754 | 11/1996 | Kato et al. ............................ | 73/504.12 |

FOREIGN PATENT DOCUMENTS

| | | | |
|---|---|---|---|
| 59-188561 | 10/1984 | Japan .................................. | 73/504.16 |
| WO 90/10196 | 9/1990 | WIPO . | |

*Primary Examiner*—Hezron Williams
*Assistant Examiner*—Helen C. Kwok
*Attorney, Agent, or Firm*—Armstrong, Westerman, Hattori, McLeland & Naughton

[57] ABSTRACT

An angular velocity sensor including a tuning-fork sensor element made of a material exhibiting piezoelectricity to have two arms formed integrally on a base and electrodes provided on surfaces of the arms. The free end of each arm is formed with an extension projecting outward in the direction of arm vibration. The surfaces of the arms lying in the direction of vibration and the surfaces thereof lying orthogonal to these surfaces are each provided with a single electrode. When the angular velocity sensor experiences an angular velocity owing to rotation about an axis orthogonal to the plane of the tuning fork, Coriolis forces act on the arms in the same direction as or the opposite direction from that of the vibration at that instant, thereby producing a bending moment. The direction and magnitude of the angular velocity can be determined by detecting the voltages produced by the bending moment.

6 Claims, 11 Drawing Sheets

ANGULAR VELOCITY SENSOR AND ANGULAR VELOCITY SENSING SYSTEM

BACKGROUND OF THE INVENTION

1. Field of the Invention

This invention relates to an angular velocity sensor utilizing a sensor element (vibrator) made of a piezoelectric material and to an angular velocity sensing system utilizing the angular velocity sensor to detect angular velocity, and is used, for example, as an angular velocity sensor in a gyroscope.

2. Description of the Related Art

Mechanical rotor-based gyroscopes have long been used in the inertial navigation systems of aircraft and ships. Although these mechanical rotor-based gyroscopes are excellent in stability and performance, they are not suitable for incorporation in small-scale equipment because of their large size and high cost.

This has led to the recent increasing application of small vibrating gyroscopes of intermediate accuracy. The vibrating gyroscope utilizes an angular velocity sensor which uses a piezoceramic to vibrate a sensor element and a separate piezoceramic provided on the sensor element to detect voltages produced by Coriolis-induced vibrations in proportion to angular velocity.

An angular velocity sensor using a quartz crystal sensor element is taught, for example, by Japanese patent laid-open publication No. 4-504617.

A conventional angular velocity sensor using a quartz crystal will be explained with reference to FIGS. 12 to 14. FIG. 12 is a perspective view of the prior-art angular velocity sensor, and FIGS. 13 and 14 are sectional views taken along lines B—B and C—C in FIG. 12.

As shown in these figures, the angular velocity sensor 60 consists mainly of a tuning-fork sensor element 61 having two arms 40, 41 and a base 42. The arms 40, 41 are formed of quartz crystal.

The arm 40 on the left side in the figures is provided with drive electrodes 43, 44, 45, 46 and sensor electrodes 51, 52, 53, 54. The arm 41 on the right side is provided with drive electrodes 47, 48, 49, 50 and sensor electrodes 55, 56, 57, 58.

Drive voltages are applied to the drive electrodes 43–50 to vibrate the arms 40 and 41 in the plane of the tuning fork (the plane in which the arms vibrate), i.e., in the directions of the arrows −X and X (along the X axis) shown in FIG. 12. At this time, if the angular velocity sensor 60 is rotated at an angular velocity ω about the longitudinal axis of the arms 40, 41 indicated by the arrow Y (the Y axis), Coriolis forces F proportional to the angular velocity ω are produced in the directions indicated by the arrows −Z and Z (along the Z axis) orthogonal to the X axis. The Coriolis force F is expressed by $$F = 2 \cdot M \cdot \omega \cdot V$$

where M is the mass of the arms and V the vibration velocity.

The Coriolis forces F excite a new vibration in the Z-axis direction of the arms 40, 41 and the new vibration produces voltages at the sensor electrodes 51–58. The direction and magnitude of the angular velocity ω produced in the angular velocity sensor 60 can be determined by detecting these voltages by means of a detection circuit.

The symbols + and − in FIGS. 13 and 14 indicate the polarity of the drive voltages applied to the drive electrodes 43–50 and the polarity of the voltages produced at the sensor electrodes 51–58.

In the so-configured prior-art angular velocity sensor, the axis of the rotation whose angular velocity is to be detected must extend in parallel with the longitudinal direction of the two arms of the tuning fork (the Y axis in FIG. 12). This limits the degree to which the thickness of the angular velocity sensor can be reduced in the direction of this axis of rotation.

Another problem with this angular velocity sensor is the overall complexity of its electrode configuration caused by providing the drive electrodes at an upper portion of the arms 40, 41, the sensor electrodes at a lower portion thereof and the means for connection with these electrodes at the base 42 of the tuning-fork sensor element 61.

Since this arrangement requires vacuum deposition or sputtering steps for forming the sensor electrodes by use of a sensor electrode mask and then forming the drive electrodes by use of a drive electrode mask, it increases the cost of fabrication.

A still further drawback of the so-configured angular velocity sensor is that as a result of mechanical coupling therein a slight leak output voltage is produced at the sensor electrodes solely by the vibration caused by the periodic application of voltage to the drive electrodes, even when no angular velocity is being experienced. Since the phase of this leak output voltage is the same as that of the angular velocity sense voltage, the sense output includes the leak output voltage superimposed on the angular velocity sense voltage.

The angular velocity sensing system utilizing the conventional angular velocity sensor of this type has no means for compensating for this leak output voltage. Since the detection of the angular velocity is therefore made based on changes in the output voltage from the angular velocity sensor including the superimposed leak output voltage, the detection accuracy is markedly degraded.

SUMMARY OF THE INVENTION

One object of this invention is to overcome the foregoing problems by providing an angular velocity sensor which is low in cost and can be made thin in the direction of the axis of the rotation whose angular velocity is to be sensed and to an angular velocity sensing system with high detection accuracy.

In order to achieve this object, the invention provides an angular velocity sensor comprising a tuning-fork sensor element formed of quartz crystal, piezoceramic or other material exhibiting piezoelectricity to have two parallel arms extending integrally from a base and electrodes provided on surfaces of the arms, a free end of each arm being formed with an extension projecting outward in a direction of arm vibration.

The electrodes are preferably provided one each on surfaces of each arm lying in the direction of vibration (X-Y surfaces) and one each on surfaces of each arm lying orthogonal to the X-Y surfaces (Y-Z surfaces).

The arms of the tuning-fork sensor element of the angular velocity sensor are provided at their free ends with the outward projecting extensions. When the tuning-fork sensor element is rotated about an axis orthogonal to the plane of the tuning fork, therefore, the resulting Coriolis forces act on the arms in proportion to the angular velocity of the rotation, thereby producing a bending moments in the arms. The direction and magnitude of the angular velocity can be determined by detecting the voltages produced by the bending moments. The thickness of the angular velocity sensor can therefore be reduced in the direction of the rotational axis.

One embodiment of the angular velocity sensing system according to the invention comprises the aforesaid angular velocity sensor, an oscillation circuit for vibrating the two arms of the tuning-fork sensor element by applying regular periodic drive voltage to the electrodes, two voltage dividers for dividing the output voltages from the electrodes of the respective arms, a differential amplifier for outputting a voltage proportional to the difference between divided voltages input thereto from the voltage dividers, a phase shifter for shifting the phase of the drive voltage produced by the oscillation circuit to the phase of the output of the differential amplifier, a detector for multiplying the output voltage of the differential amplifier and the output voltage of the phase shifter and outputting the product, and a low-pass filter for extracting the DC component from the output of the detector and outputting a signal of a polarity and voltage corresponding to the direction and magnitude of angular velocity experienced by the angular velocity sensor.

Since this angular velocity sensing system cancels the leak output voltage component superimposed on the sense voltage in the angular velocity sensor, it can detect the angular velocity experienced by the angular velocity sensor with high accuracy.

The above and other objects, features and advantages of the invention will be apparent from the following detailed description which is to be read in conjunction with the accompanying drawings.

DETAILED DESCRIPTION OF THE PREFERRED EMBODIMENTS

Embodiments of the invention will now be explained with reference to the drawings.

An angular velocity sensor that is an embodiment of the invention will be explained first with reference to FIGS. 1 to 4.

Figure 1:
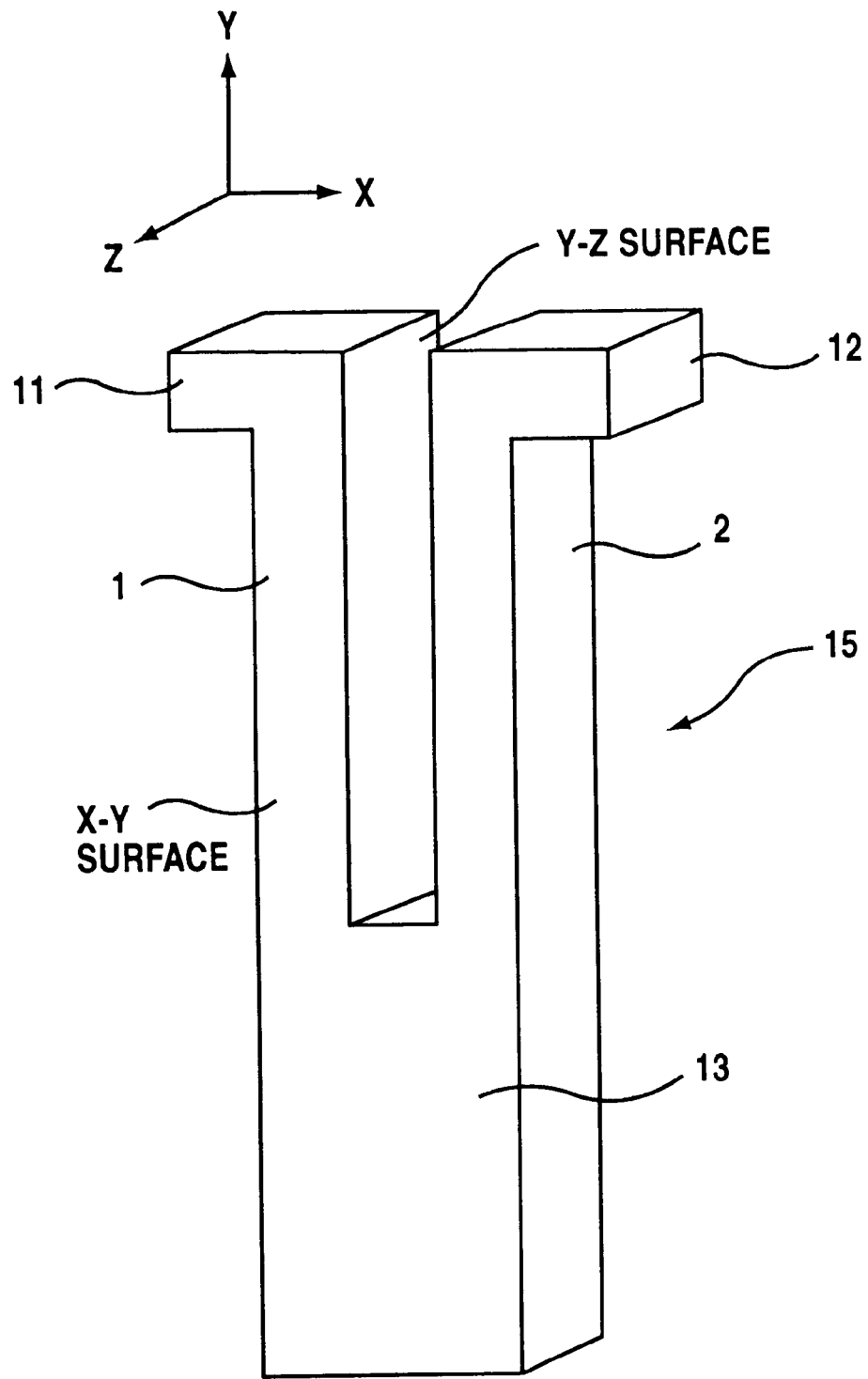
FIG. 1 is a perspective view showing only the sensor element of an angular velocity sensor that is an embodiment of the invention.
Figure 2:
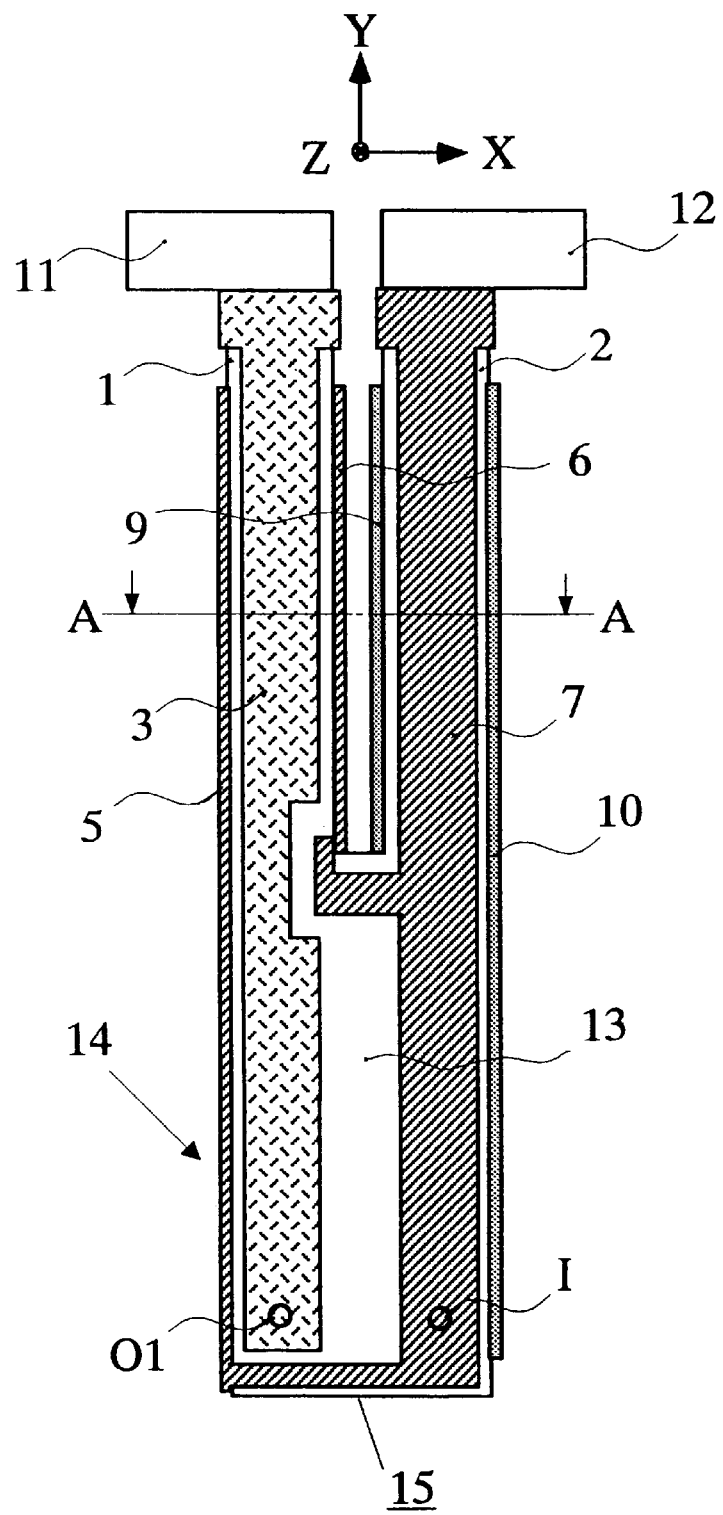
FIGS. 2 and 3 are a front view and a rear view of an angular velocity sensor constituted by forming electrodes on the surfaces of the sensor element of FIG. 1.
Figure 3:
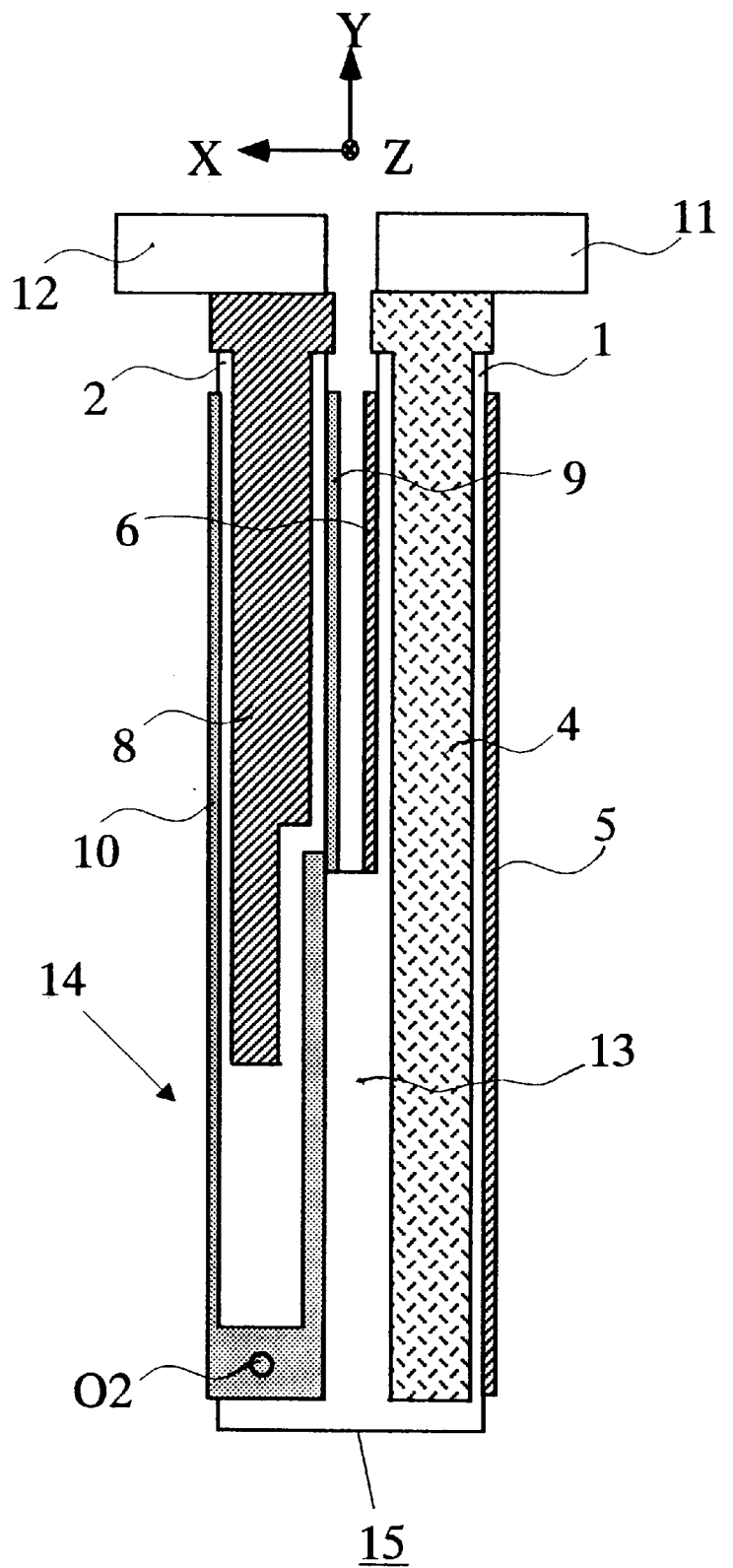
Figure 4:
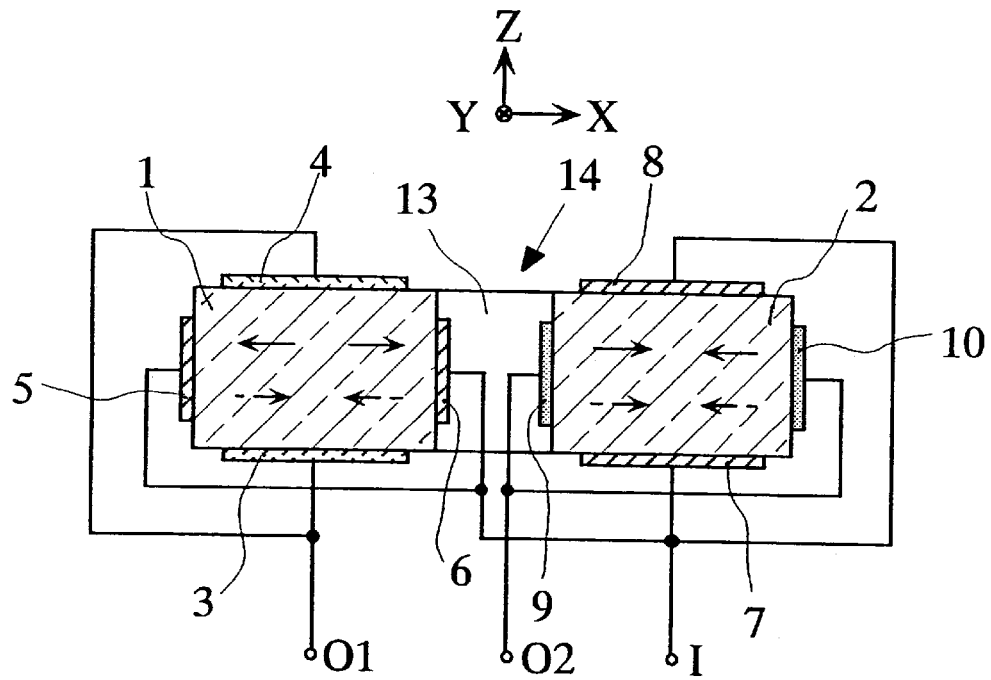
FIG. 4 is a sectional view taken along line A—A in FIG. 2.

FIG. 1 is a perspective view showing only the sensor element of the angular velocity sensor. FIGS. 2 and 3 are a front view and a rear view of an angular velocity sensor constituted by forming electrodes on the surfaces of the sensor element. FIG. 4 is a sectional view taken along line A—A in FIG. 2.

As shown in FIG. 1, the angular velocity sensor 14 of this embodiment consists mainly of a tuning-fork sensor element 15 having two parallel arms 1, 2 and a base 13. The arms 1, 2 are formed integrally with the base 13. The sensor element 15 is made of a material, such as quartz crystal, exhibiting piezoelectricity. When the sensor element 15 is made of a quartz crystal, the X, Y and Z crystal axes shown in FIG. 1 are slightly offset from the corresponding X, Y and Z axes of the raw quartz. The same symbols are used in FIG. 1, however, out of convenience.

The X axis corresponds to the width direction of the sensor element 15, the Y axis to its length direction and the Z axis to its thickness direction. The arm 1, arm 2 and base 13 of the angular velocity sensor 14 therefore have X-Y surfaces lying parallel to the direction of vibration of the arms 1, 2 (plane of the tuning fork) and Y-Z surfaces lying in a second direction orthogonal to the X-Y surfaces (plane orthogonal to the plane of the tuning fork).

The free end of the arm 1 of the sensor element 15 is formed with an extension 11 projecting outward in the vibration direction (in the negative direction of the X axis), while the free end of the arm 2 thereof is formed with an extension 12 also projecting outward in the vibration direction (in the positive direction of the X axis).

Owing to the provision of the extensions 11, 12 at the free ends of the arms 1, 2 of the sensor element 15 in this manner, the angular velocity sensor 14 can sense the angular velocity of a rotation about an axis orthogonal to the plane of the tuning fork. This will be explained in detail below.

The electrode configuration of the angular velocity sensor 14 will now be explained.

As shown in FIGS. 2 to 4, the X-Y surfaces and Y-Z surfaces the arms 1, 2 of the sensor element 15 are provided one each with drive electrodes. Specifically, drive electrodes 3, 4, 5, 6 are provided on the surfaces of the arm 1 and drive electrodes 7, 8, 9, 10 are provided on the surfaces of the arm 2.

The electrodes hatched or shaded in the same pattern in FIGS. 2 to 4 are interconnected. Specifically, the drive electrodes 3 and 4 are connected at the top of the arm 1, drive electrodes 9 and 10 are connected at the base 13 of the sensor element 15, and the drive electrodes 5, 6, 7 and 8 are connected at the base 13 of the sensor element 15 and the top of the arm 2.

The drive electrodes 3–10 can be formed in a single operation by, for example, vapor deposition or sputtering using a mask pattern.

As shown in FIGS. 2 and 4, the drive electrodes 3, 4 of the arm 1 are provided with an output terminal O1 and, as shown in FIGS. 3 and 4, the drive electrodes 9, 10 of the arm 2 are provided with an output terminal O2. Further, as shown in FIGS. 2 and 4, the drive electrodes 5, 6 of the arm 1 and the drive electrodes 7, 8 of the arm 2 are provided with an input terminal I. In the angular velocity sensor 14, the drive electrodes also serve as sensor electrodes.

Application of regular periodic drive voltage between the input terminal I and the output terminals O1, O2 of the angular velocity sensor 14 activates flexural vibration of the arms 1, 2 of the sensor element 15 in the X-Y plane as shown by the solid arrows in FIG. 3. The phase of the vibration is reversed between the left and right arms 1, 2.

The principle of angular velocity detection in this embodiment of the angular velocity sensor will now be explained with reference to FIGS. 5 and 6.

Figure 5:
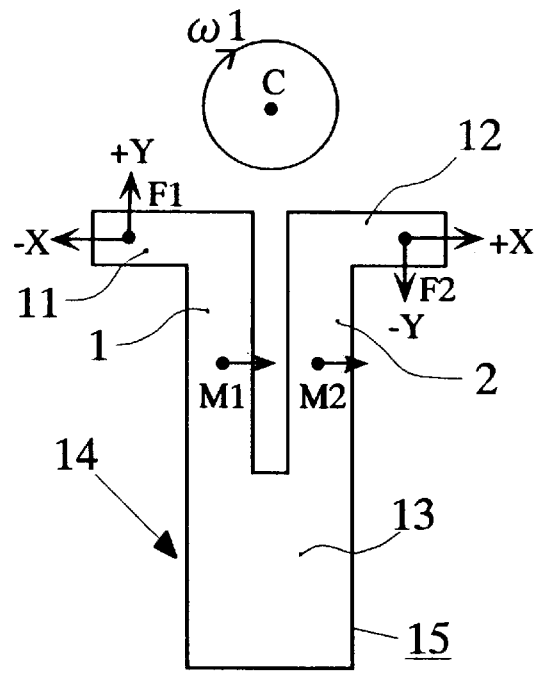
FIGS. 5 and 6 are diagrams for explaining the principle of angular velocity detection by the angular velocity sensor shown in FIGS. 1 to 4.
Figure 6:
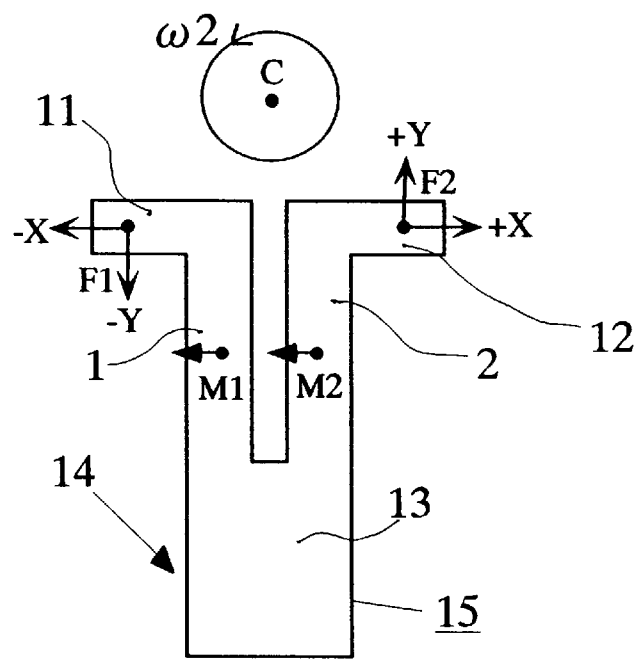

FIGS. 5 and 6 are both diagrams relating to cases where the angular velocity sensor 14, while being driven to vibrate, experiences an angular velocity owing to rotation about a rotational axis C lying orthogonal to the plane of the tuning fork (in the direction of the Z axis perpendicular to the drawing sheet). FIG. 5 shows the case where the angular velocity sensor 14 experiences an angular velocity ω1 owing to clockwise rotation and FIG. 6 the case where it experiences an angular velocity ω2 owing to counterclockwise rotation.

Assume that, as shown in FIG. 5, the angular velocity sensor 14 experiences a clockwise rotation of an angular velocity ωb 1in the plane of the tuning fork. Then, at an instant when the vibrational movement of the extension 11 of the arm 1 is in the −X direction, a Coriolis force F1 acts on the extension 11 in the +Y direction (upward). Simultaneously, a Coriolis force F2 acts on the extension 12 of the arm 2 in the −Y direction (downward) because it is moving in the +X direction at this instant.

The Coriolis force F1 produces a moment M1 acting on the arm 1 in the +X direction opposite the vibration direction thereof (−X), while the Coriolis force F2 produces a moment M2 acting on the arm 2 in the same direction as the vibration direction thereof (+X). The moment M1 and the moment M2 thus act in the same direction.

Next, assume that, as shown in FIG. 6, the angular velocity sensor 14 experiences a counterclockwise rotation of an angular velocity ω2 in the plane of the tuning fork. Then, at an instant when the vibrational movement of the extension 11 of the arm 1 is in the −X direction, the Coriolis force F1 acts on the extension 11 in the −Y direction (downward). Simultaneously, the Coriolis force F2 acts on the extension 12 of the arm 2 in the +Y direction (upward) because it is moving in the +X direction at this instant.

It therefore follows that the moment M1 produced by the Coriolis force F1 acts on the arm 1 in the vibration direction (−X direction) and the moment M2 produced by the Coriolis force F2 acts on the arm 2 in the opposite direction (−X direction) from the vibration direction (+X direction). The moment M1 and the moment M2 thus both act in the same direction and oppositely from the case of FIG. 5.

Each of the moments M1, M2 acting on the arms produces an electric field whose direction depends on the direction of the moment and whose magnitude is proportional to magnitude thereof. Since this electric field produces a voltage whose polarity depends on the direction of the angular velocity and whose magnitude is proportional to the magnitude thereof, the voltage produced by the electric field can be used to detect the angular velocity.

An embodiment of an angular velocity sensing system utilizing the angular velocity sensor 14 will now be explained.

Figure 7:
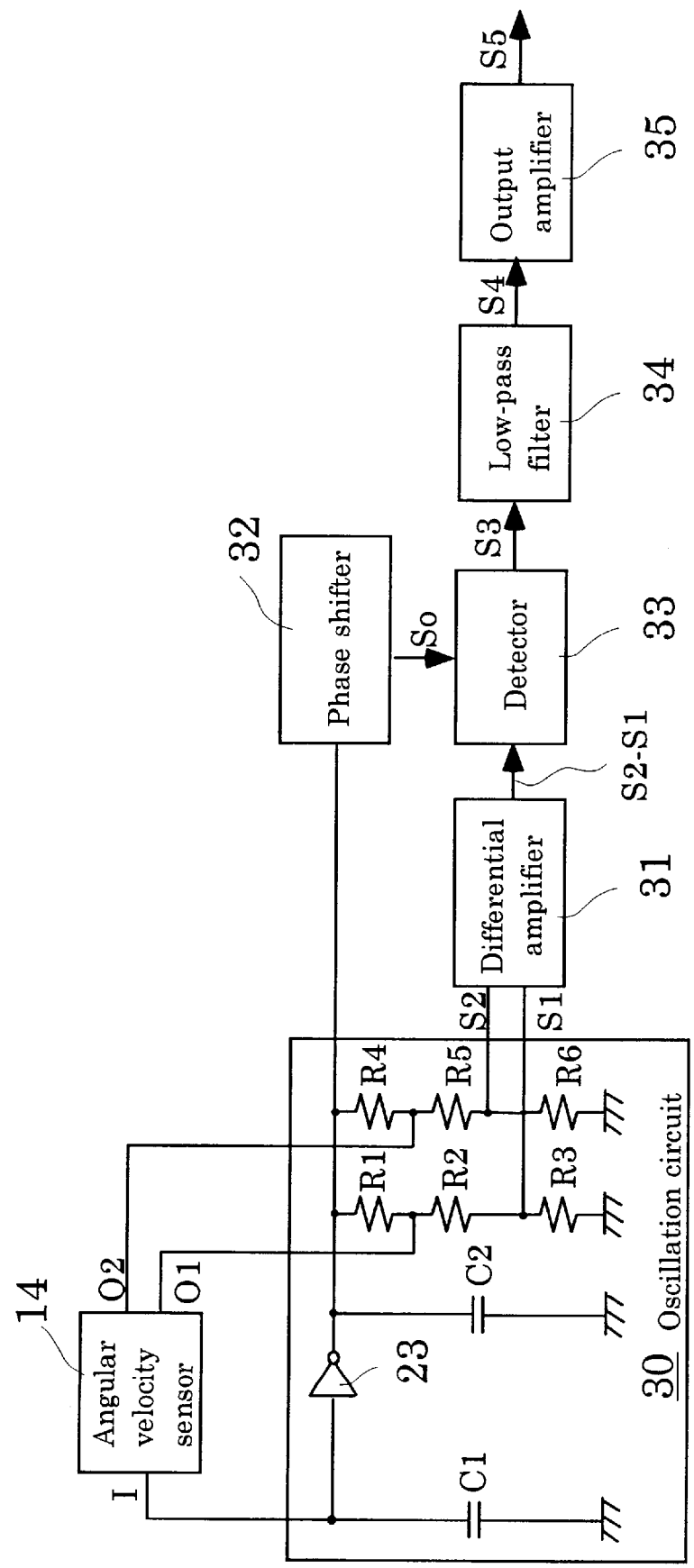
FIG. 7 is a block diagram showing an angular velocity sensing system that is an embodiment of the invention.

FIG. 7 is a block diagram showing the angular velocity sensing system. The angular velocity sensing system comprises the angular velocity sensor 14 and a detection circuit constituted of an oscillation circuit 30, a differential amplifier 31, a phase shifter 32, a detector 33, a low-pass filter 34 and an output amplifier 35.

The input terminal I of the angular velocity sensor 14 is connected to the input terminal of an amplifier 23 of the oscillation circuit 30 and to ground through a capacitor C1. The output terminal of the amplifier 23 is connected to ground through a capacitor C2 and also through a parallel circuit consisting of a first voltage divider constituted of series-connected resistors R1, R2, R3 and a second voltage divider constituted of series-connected resistors R4, R5, R6.

The connection point between the series-connected resistors R1 and R2 is connected to the output terminal O1 of the angular velocity sensor 14 and the connection point between the series-connected resistors R4 and R5 is connected to the output terminal O2 of the angular velocity sensor 14.

The oscillation circuit 30 produces a regular periodic drive voltage that is applied between the input terminal I and the output terminals O1, O2 of the angular velocity sensor 14 to vibrate the arms 1, 2 of the sensor element 15. The output voltages produced at the arms 1, 2 of the angular velocity sensor 14 are extracted from the output terminals O1, O2.

The output voltage of the first output terminal O1 is divided by the series-connected resistors R2 and R3 of the first voltage divider and input as voltage signal S1 to one input terminal of the differential amplifier 31. The output voltage of the second output terminal O2 is divided by the series-connected resistors R5 and R6 of the second voltage divider and input as voltage signal S2 to the other input terminal of the differential amplifier 31.

The series-connected resistors R1–R3 constituting the first voltage divider and the series-connected resistors R4–R6 constituting the second voltage divider need not be provided inside the oscillation circuit 30 as shown but can instead be provided externally thereof.

The differential amplifier 31 outputs a voltage signal S2−S1 corresponding to the difference between the two voltage signals S2 and S1 input thereto.

The phase shifter 32 shifts the phase of the regular periodic drive voltage produced by the oscillation circuit 30 to the phase of the output of the differential amplifier 31 and outputs the phase-shifted voltage as a voltage signal S0.

The detector 33 multiplies the output voltage of the differential amplifier 31 and the output voltage of the phase shifter 32 and outputs the product as a voltage signal S3.

The low-pass filter 34 extracts and smooths the DC component from the voltage signal S3 output by the detector 33 and outputs a signal S4 of a polarity and voltage corresponding to the direction and magnitude of the angular velocity experienced by the angular velocity sensor 14.

The output amplifier 35 amplifies the DC voltage signal S4 extracted by the low-pass filter 34 and outputs the amplified signal as an angular velocity detection signal S5.

Figure 8:
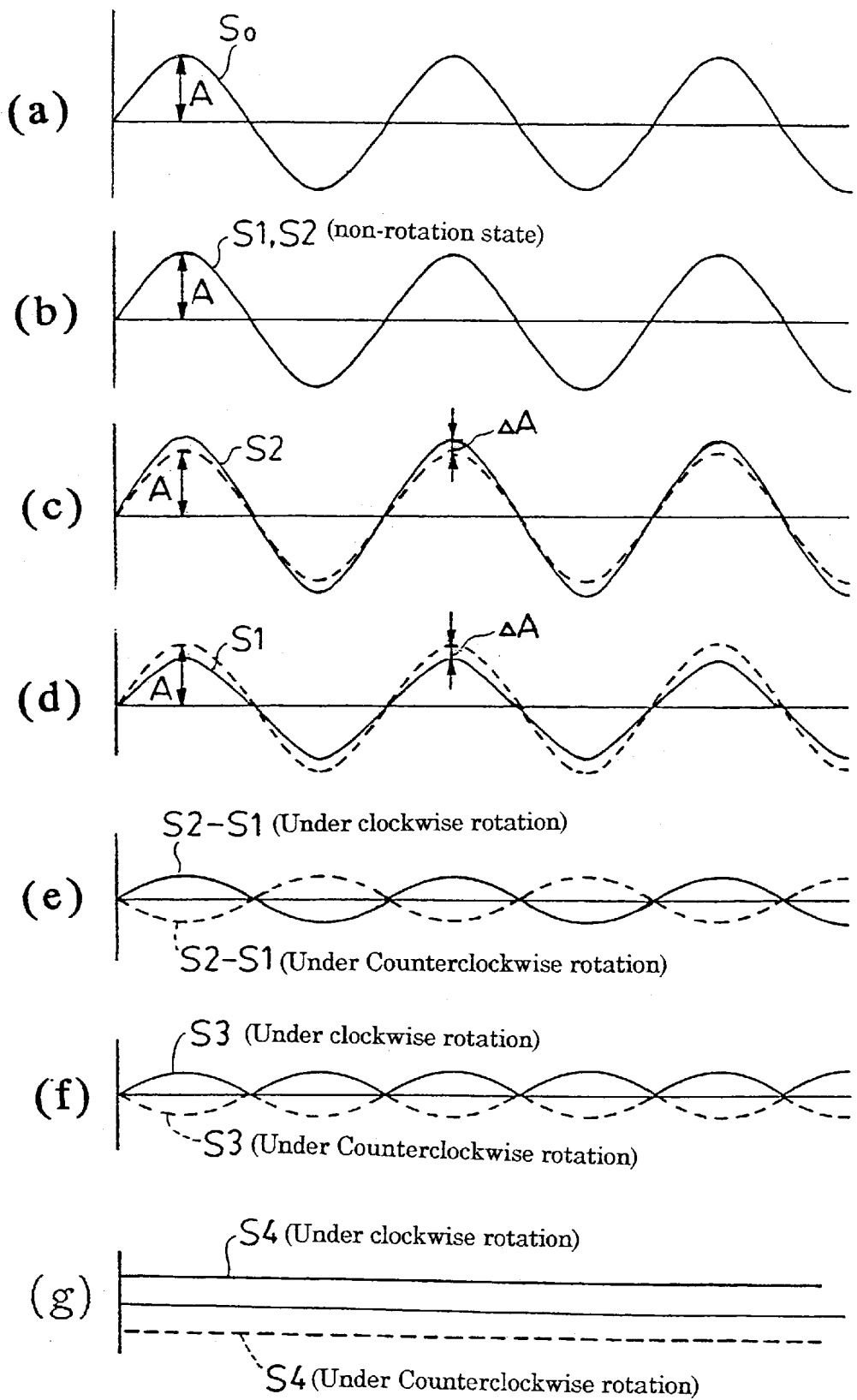
FIG. 8 is a waveform diagram showing the signal waveforms at different portions in the detection circuit in FIG. 7.

The angular velocity detection operation of the angular velocity sensing system will now be explained in detail with further reference to FIGS. 4 and 8. FIG. 8 is a waveform diagram of the signals in FIG. 7.

As shown at (a) in FIG. 8, the voltage signal S0 output by the phase shifter 32 in response to the drive voltage is a sine wave (A·Sin ωt) of crest value A.

In the voltage dividers, the resistance ratios between the resistors R2 and R3 and between the resistors R5 and R6 are adjusted so that when the angular velocity sensor is experiencing no angular velocity (non-rotating state), the two voltage signals S1 and S2 input to the differential amplifier 31 are, as shown at (b) in FIG. 8, identical sine waves (A·Sin ωt) having the same crest value A as the voltage signal S0. In the non-rotating state, therefore, the output voltage of the differential amplifier 31 (S2−S1) is zero and the leak output voltage component in the angular velocity sensor 14 is canceled to enable angular velocity detection with good accuracy.

The detection of angular velocity will now be explained with respect to the specific case where, as discussed earlier with respect to FIG. 5, the angular velocity sensor 14, while being driven to vibrate, experiences an angular velocity ωw owing to clockwise rotation about a rotational axis C orthogonal to the plane of the tuning fork.

When the angular velocity sensor 14 experiences the angular velocity ω1, the resulting Coriolis force F produces a moment M1 which, as explained earlier, acts on the arm 1 of the angular velocity sensor 14 in the direction indicated by the dashed arrow in FIG. 4 which is opposite in phase to the direction of the vibration produced by the drive voltage indicated by the solid arrow. The voltage this produces is therefore opposite in polarity to the voltage produced by the vibration.

As shown by the solid curve at (d) in FIG. 8, since this voltage component ΔA caused by the moment M1 produced by the Coriolis force acting on the arm 1 is subtracted from the sine wave (A·Sin ωt) of crest value A (dashed curve) caused by the vibration produced by the drive voltage, the voltage signal S1 has its crest value decreased by ΔA at this time and becomes a sine wave ((A-ΔA) Sin ωt).

On the other hand, the moment M2 produced by the Coriolis force F acting on the arm 2 of the angular velocity sensor 14 acts in the direction indicated by the dashed arrow in FIG. 4 which is in the same phase as the direction of the vibration produced by the drive voltage indicated by the solid arrow. The voltage this produces is therefore of the same polarity as the voltage produced by the vibration.

As shown by the solid curve at (c) in FIG. 8, since this voltage component ΔA caused by the moment M2 produced by the Coriolis force acting on the arm 2 is added to the sine wave (A·Sin ωt) of crest value A (dashed curve) caused by the vibration produced by the drive voltage, the voltage signal S2 has its crest value increased by ΔA at this time and becomes a sine wave ((A+ΔA) Sin ωt).

The voltage signal S2–S1 output by the differential amplifier 31 therefore becomes $$S2 - S1 = (A + \Delta A)\sin\omega t - (A - \Delta A)\sin\omega t$$
$$= 2\Delta A \cdot \sin\omega t$$

This signal is represented by the solid curve at (e) in FIG. 8. The dashed curve here indicates the waveform of the voltage signal S2–S1 when the angular velocity sensor 14 experiences an angular velocity owing to counterclockwise rotation and is inverted in phase from the waveform of the solid curve at the time of clockwise rotation.

The detector 33 multiplies the output voltage of the differential amplifier 31 and the voltage signal S0 produced in response to the drive voltage (shown at (a) of FIG. 8) and outputs the positive full-wave detection output voltage S3 indicated by the solid curve at (f) in FIG. 8. The dashed curve here indicates the waveform of the detection output voltage S3 when the angular velocity sensor 14 experiences an angular velocity owing to counterclockwise rotation, in which case S3 becomes a negative full-wave signal. The detection output voltage S3 can be represented as $$S3 = A \cdot \sin\omega t \cdot 2\Delta A \cdot \sin\omega t$$
$$= A \cdot 2\Delta A(1 - \cos 2\omega t)/2$$
$$= A \cdot \Delta A(1 - \cos 2\omega t)$$

The low-pass filter 34 extracts the DC component A·ΔA of the detection output voltage S3. As shown by the solid curve at (g) in FIG. 8, the resulting signal S4 is a positive voltage when the rotation is clockwise. The polarity and magnitude of this signal correspond to the direction and magnitude of the angular velocity experienced by the angular velocity sensor 14. The voltage varies with the magnitude of the angular velocity.

When the angular velocity sensor 14 experiences an angular velocity owing to counterclockwise rotation, the detection output voltage S3 of the detector 33 becomes a negative full-wave voltage signal as shown by the dashed curve at (e) in FIG. 8. The output signal S4 of the low-pass filter 34 therefore also becomes a negative voltage as shown by the dashed curve at (g).

The output signal S4 of the low-pass filter 34 is amplified by the output amplifier 35 and output as angular velocity detection signal S5.

As explained in the foregoing, in this angular velocity sensing system the differential amplifier 31 cancels out the components of the output voltages produced by the arms 1, 2 of the sensor element 15 of the angular velocity sensor 14 to enable detection of only the voltages produced by the moments owing to Coriolis forces proportional to the angular velocity experienced. Output voltages proportional to the angular velocity are therefore obtained and the angular velocity can be measured based thereon.

Another embodiment of the angular velocity sensor according to the invention will now be explained with reference to FIG. 9.

In this angular velocity sensor 14', only the electrodes 3–6 provided on the surfaces of the arm 1 of the sensor element are used as drive electrodes and the electrodes 17–20 provided on the surfaces of the other arm 2 are used as sensor electrodes.

Figure 9:
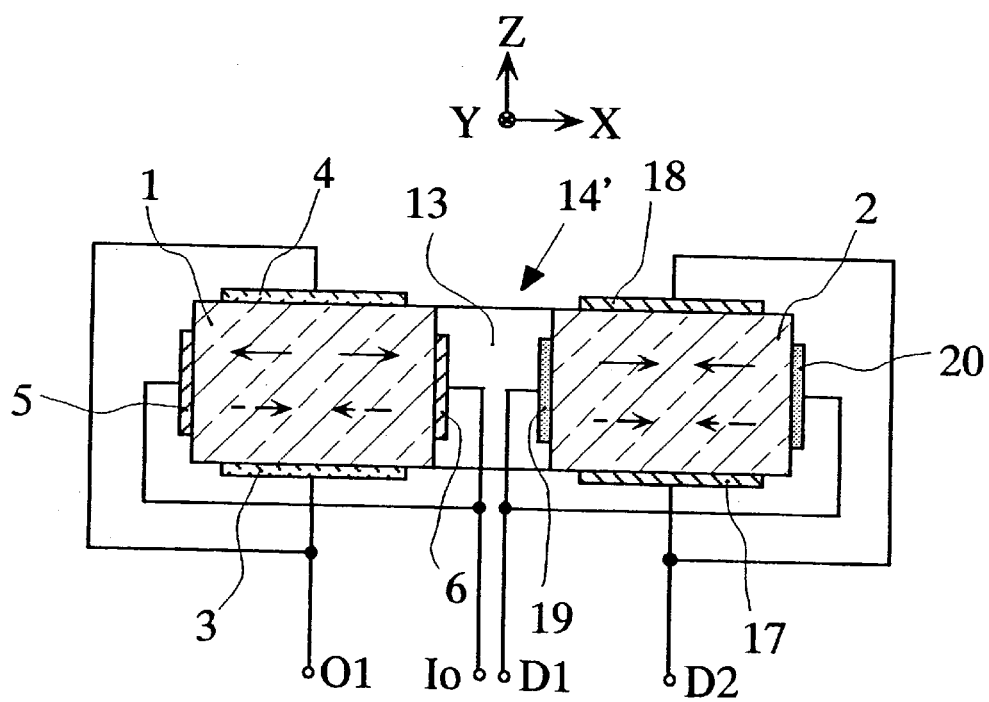
FIG. 9 is a sectional view similar to that of FIG. 4 showing an angular velocity sensor that is another embodiment of the invention.

As shown in FIG. 9, the pair of drive electrodes 3 and 4 provided on the surfaces in a first direction of the arm 1 (the X-Y surfaces) are connected and provided with an output terminal O1 and the pair of drive electrodes 5 and 6 provided on the surfaces in a second direction (the Y-Z surfaces) are connected and provided with an input terminal IO.

On the other hand, the pair of sensor electrodes 17 and 18 provided on the surfaces in the second direction of the arm 2 are connected and provided with a first sensor terminal D1 and the pair of sensor electrodes 19 and 20 provided on the surfaces in the first direction are connected and provided with a second sensor terminal D2.

No explanation will be made regarding the other aspects of the configuration since they are the same as that of the angular velocity sensor 14 shown in FIGS. 1 to 3, aside from the fact that the electrodes 5, 6 and the electrode 7 in FIG. 2 (electrode 17 in FIG. 9) are not connected.

Another embodiment of the angular velocity sensing system according to the invention, which utilizes the angular velocity sensor 14' shown in FIG. 9, will now be explained with reference to FIGS. 10 and 11.

Figure 10:
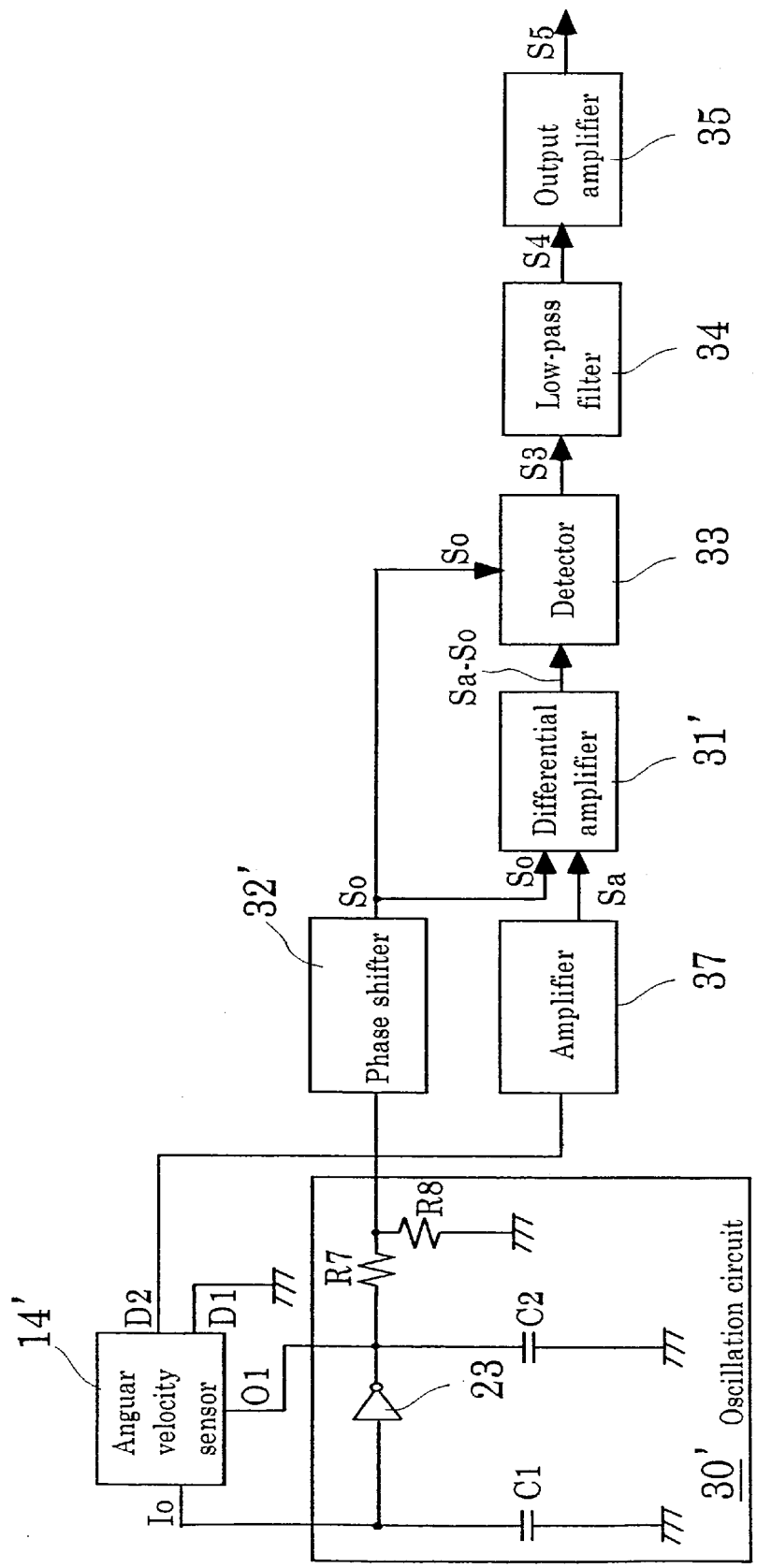
FIG. 10 is a block diagram showing an angular velocity sensing system that is another embodiment of the invention.

FIG. 10 is a block diagram showing the angular velocity sensing system. The angular velocity sensing system comprises the angular velocity sensor 14' and a detection circuit constituted of an oscillation circuit 30', an amplifier 37, a differential amplifier 31', a phase shifter 32', a detector 33, a low-pass filter 34 and an output amplifier 35.

The input terminal IO of the angular velocity sensor 14' is connected to the input terminal of an amplifier 23 of the oscillation circuit 30' and to ground through a capacitor C1.

The output terminal of the amplifier 23 of the oscillation circuit 30' is connected to the output terminal O1 of the angular velocity sensor 14' and to ground through a capacitor C2 and also through a series circuit of resistors R7 and R8 constituting a voltage divider.

The oscillation circuit 30' produces a regular periodic drive voltage that is applied between the input terminal IO and the output terminal O1 of the angular velocity sensor 14' to vibrate the arms 1, 2 of the sensor element.

The first sensor terminal D1 of the angular velocity sensor 14' is grounded and output voltage produced at the second sensor terminal D2 is input to and amplified by the amplifier 37.

The resistors R7, R8 constituting the voltage divider divide and adjust the level of the drive voltage produced by the oscillation circuit 30', and the phase shifter 32' phase-shifts the resulting voltage signal to the phase of the output from the amplifier 37.

The differential amplifier 31' outputs a voltage Sa - SO corresponding to the difference between the output voltage Sa of the amplifier 37 and the output voltage SO of the phase shifter 32'. The detector 33 multiplies the output voltage of the differential amplifier 31' and the output voltage SO from the phase shifter 32' and outputs a detection output voltage S3.

The low-pass filter 34 and the output amplifier 35 are the same as those in the embodiment shown in FIG. 7 described earlier.

Figure 11:
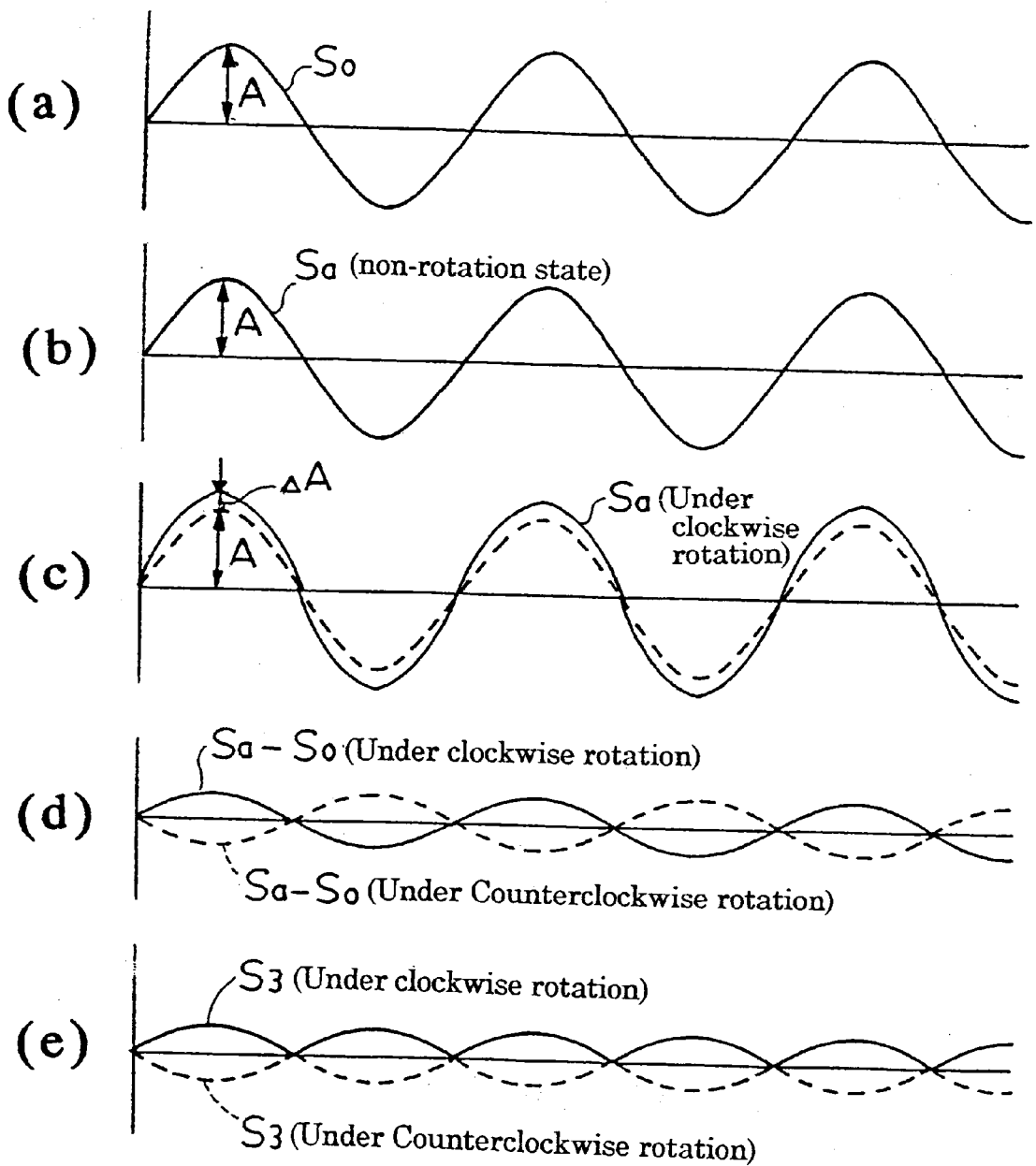
FIG. 11 is a waveform diagram showing the signal waveforms at different portions of the detection circuit in FIG. 10.
Figure 12:
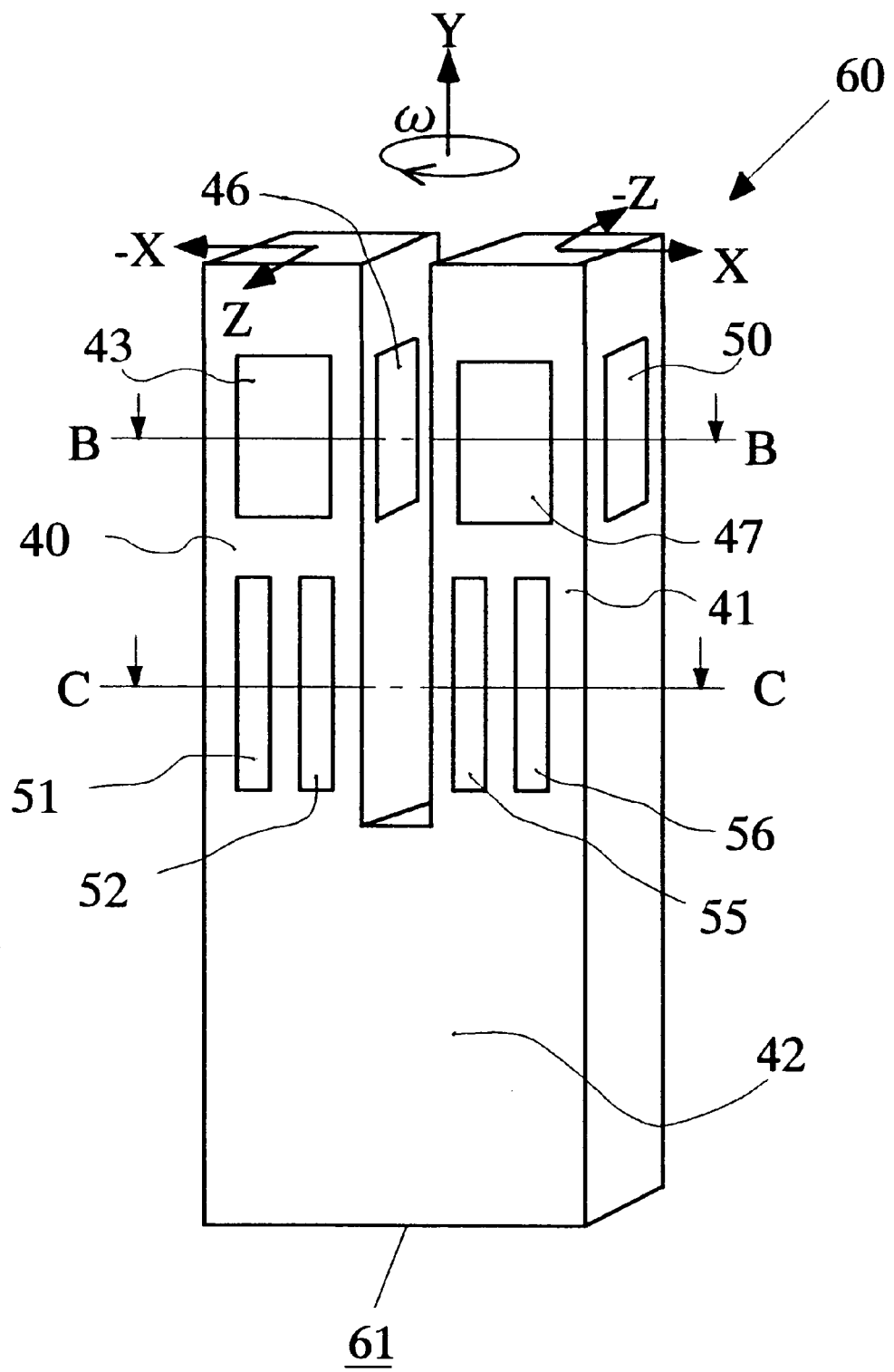
FIG. 12 is a perspective view of a conventional angular velocity sensor.
Figure 13:
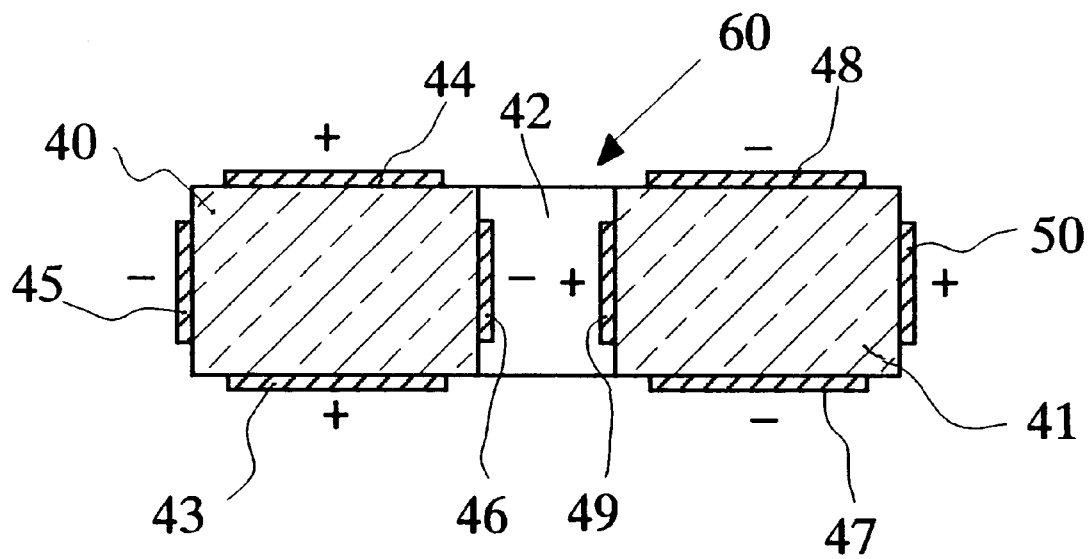
FIGS. 13 and 14 are sectional views taken along lines B—B and C—C in FIG. 12.
Figure 14:
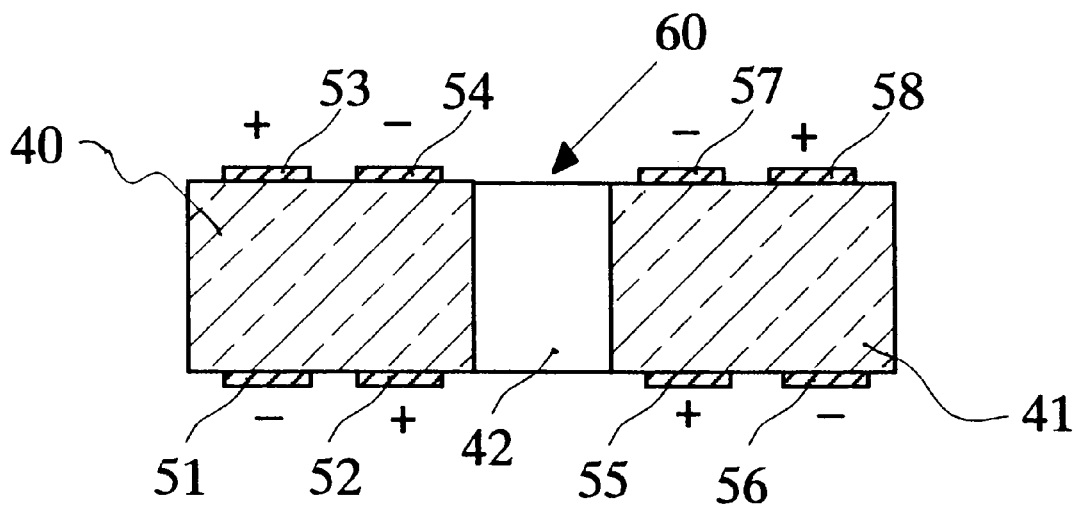

FIG. 11 is a diagram showing the waveforms of the signals at different portions in FIG. 10, (a) showing the output voltage SO of the phase shifter 32' and (b) the output voltage Sa of the amplifier 37 when the angular velocity sensor 14' is experiencing no angular velocity (non-rotating state).

Level adjustment by the resistors R7 and R8 and phase shifting by the phase shifter 32' are effected so that the output voltages SO and Sa become sine waves ($A \cdot \text{Sin } \omega t$) of the same crest value A and phase. This enables the angular velocity detection to be achieved with excellent accuracy.

As shown by the solid curve at (c) in FIG. 11, when the angular velocity sensor 14' experiences an angular velocity owing to clockwise rotation, the crest value of the output voltage Sa of the amplifier 37 is increased, relative to the output voltage in the non-rotating state indicated by the dashed curve, by the voltage component $\Delta A$ corresponding to the angular velocity, and becomes a sine wave (($A+\Delta A$) Sin $\omega t$).

The output voltage Sa−SO from the differential amplifier 31' therefore becomes as shown by the solid curve at (d) in FIG. 11 and, as shown by the solid curve at (e), the detection output voltage S3 from the detector 33 becomes a positive full-wave voltage signal dependent on the magnitude of the angular velocity.

When the angular velocity sensor 14' experiences an angular velocity owing to counterclockwise rotation, the crest value of the output voltage Sa of the amplifier 37 is decreased, relative to the output voltage in the non-rotating state, by the voltage component $\Delta A$ corresponding to the angular velocity, and becomes a sine wave (($A-\Delta A$) Sin $\omega t$).

The output voltage Sa-SO from the differential amplifier 31' therefore becomes as shown by the dashed curve at (d) in FIG. 11 and, as shown by the dashed curve at (e), the detection output voltage S3 from the detector 33 becomes a negative full-wave voltage signal dependent on the magnitude of the angular velocity.

The low-pass filter 34 extracts the DC component from the detection output voltage S3 of the detector 33 and outputs a signal S4 whose polarity and voltage correspond to the direction and magnitude of the angular velocity experienced by the angular velocity sensor 14'. The output signal S4 is amplified by the output amplifier 35 and output as angular velocity detection signal S5.

As is clear from the foregoing explanation, the angular velocity sensor according to the invention can be made thin in the direction of the rotational axis since the extensions provided to project outward from the free ends of the two arms of the tuning-fork sensor element in the direction of arm vibration enable sensing of angular velocity owing to rotation about an axis orthogonal to the plane of the tuning fork.

In addition, the angular velocity sensor need not be provided with drive electrodes and sensor electrodes on each arm of the sensor element but requires provision of only one electrode on each arm surface. Since this simplifies the electrode configuration, the electrodes can be formed easily and at low cost. Moreover, the fact that the electrode configuration is completely symmetrical makes it possible to lower cost since, for instance it enables fabrication to be conducted using a production line for tuning fork-type quartz crystals for watches.

The angular velocity sensing system according to the invention completely cancels voltages from the angular velocity sensor unrelated to the angular velocity, including voltages resulting from drive-voltage induced vibration and leak output voltages, and detects only the voltages arising in response to angular velocity experienced by the angular velocity sensor. It can therefore sense the direction and magnitude of angular velocity with high accuracy.

Although the foregoing embodiments relate to examples in which quartz crystal is used as the material of the sensor elements 15 of the angular velocity sensors 14, 14', the invention is not limited to the use of quartz crystal and the sensor element can instead be formed of any of various other materials exhibiting piezoelectricity such as lithium tantalate single crystal, lithium niobate single crystal, lithium borate single crystal and the like. Use of a piezoceramic such as ceramic lead titanate zirconate (PZT) is also possible.

The sensor element can also be fabricated by forming a piezoelectric film on a silicon substrate by high-frequency sputtering of ZnO or other piezoelectric material.

Although the electrode structure of the angular velocity sensor was explained as involving provision of a single drive electrode on every surface of the two arms of the sensor element, it is alternatively possible to provide drive electrodes each in the form of three stripes on the opposite X-Y surfaces of the two arms.

Further, the material of the extensions provided at the free ends of the arms of the sensor element is not limited to quartz crystal and it is instead possible to attach members made of a material of higher density than quartz crystal to the free ends of the arms by bonding.

What is claimed is:

1. An angular velocity sensor, comprising:
    a tuning-fork sensor element formed of piezoelectric material and having two parallel arms extending integrally from a base and electrodes provided on surfaces of the arms, a free end of each arm being formed with an extension projecting outward in a direction of arm vibration (direction of x-axis),
    wherein the electrodes are provided one each on first surfaces of each arm lying in the direction of vibration (X-Y surfaces) and one each on second surfaces of each arm lying orthogonal to the X-Y surfaces (Y-Z surfaces), and wherein the electrodes provided one each on the first surfaces and the second surfaces of each arm are all electrodes which serve as both drive electrodes for vibrating each arm in phase opposite to each other in a width direction (direction of X axis) of the sensor element and sensor electrodes for detecting moments which act on each arm as a result of Coriolis force exerted on the extensions depending on the angular velocity when the sensor element is rotated about a rotational axis in a direction of thickness (direction of Z axis), the electrodes provided on the first surfaces of one arm are connected and provided with a first output terminal, the electrodes provided on the second surfaces of the one arm and the electrodes provided on the first surfaces of the other arm are connected and provided with an input terminal, and the electrodes provided on the second surfaces of the other arm are connected and provided with a second output input terminal.

2. An angular velocity sensor, comprising:

a tuning-fork sensor element formed of piezoelectric material and having two parallel arms extending integrally from a base and electrodes provided on surfaces of the arms, a free end of each arm being formed with an extension projecting outward in a direction of arm vibration (direction of x-axis), wherein the electrodes are provided one each on first surfaces of each arm lying in the direction of vibration (X-Y surfaces) and one each on second surfaces of each arm lying orthogonal to the X-Y surfaces (Y-Z surfaces), and wherein drive electrodes are provided as the electrodes provided one each on the first surfaces and the second surfaces of one arm and sensor electrodes are provided as the electrodes provided one each on the first surfaces and the second surfaces of the other arm, the drive electrodes are electrodes for vibrating each arm in phase opposite to each other in a width direction (direction of X axis) of the sensor element, the sensor electrodes are electrodes for detecting moments which act on each arm as a result of Coriolis force exerted on the extensions depending on the angular velocity when the sensor element is rotated about a rotational axis in a direction of thickness (direction of Z axis), the drive electrodes provided on the first surfaces of the one arm are connected and provided with an output terminal, the drive electrodes provided on the second surfaces of the one arm are connected and provided with an input terminal, the sensor electrodes provided on the second surfaces of the other arm are connected and provided with a first sensor terminal, and the sensor electrodes provided on the first surfaces of the other arm are connected and provided with a second sensor terminal.

3. An angular velocity sensing system comprising:

the angular velocity sensor of claim 1, an oscillation circuit for vibrating the two arms of the angular velocity sensor by applying regular periodic drive voltage between the input terminal and both of the first output terminal and the second output terminal, a first voltage divider for dividing an output voltage from the first output terminal, a second voltage divider for dividing an output voltage from the second output terminal, a differential amplifier for outputting a voltage proportional to a difference between divided voltages input thereto from the first voltage divider and the second voltage divider, a phase shifter for shifting a phase of the drive voltage produced by the oscillation circuit to a phase of the output of the differential amplifier, a detector for multiplying the output voltage of the differential amplifier and an output voltage of the phase shifter and outputting the product, and a low-pass filter for extracting a DC component from the output of the detector and outputting a signal of a polarity and voltage corresponding to the direction and magnitude of angular velocity experienced by the angular velocity sensor.

4. An angular velocity sensing system comprising:

the angular velocity sensor of claim 2, an oscillation circuit for vibrating the two arms of the angular velocity sensor by applying regular periodic drive voltage between the input terminal and the output terminal, an amplifier for amplifying an output voltage produced between the first sensor terminal and the second sensor terminal, a voltage divider for dividing the drive voltage produced by the oscillation circuit, a phase shifter for shifting a phase of a voltage signal divided by the voltage divider to a phase of the output of the amplifier, a differential amplifier for outputting a voltage proportional to a difference between an output voltage of the amplifier and an output voltage of the phase shifter input thereto, a detector for multiplying the output voltage of the differential amplifier and the output voltage of the phase shifter and outputting the product, and a low-pass filter for extracting a DC component from the output of the detector and outputting a signal of a polarity and voltage corresponding to the direction and magnitude of angular velocity experienced by the angular velocity sensor.

5. An angular velocity sensor, comprising:

a tuning-fork sensor element formed of piezoelectric material and having two parallel arms extending integrally from a base and electrodes provided on surfaces of the arms, a free end of each arm being formed with an extension projecting outward in a direction of arm vibration (direction of x-axis), wherein the electrodes are provided one each on first surfaces of each arm lying in the direction of vibration (X-Y surfaces) and one each on second surfaces of each arm lying orthogonal to the X-Y surfaces (Y-Z surfaces), and wherein the electrodes provided one each on the first surfaces and the second surfaces of each arm are all electrodes which serve as both drive electrodes for vibrating each arm in phase opposite to each other in a width direction (direction of X axis) of the sensor element and sensor electrodes for detecting moments which act on each arm as a result of Coriolis force exerted on the extensions depending on the angular velocity when the sensor element is rotated about a rotational axis in a direction of thickness (direction of Z axis).

6. An angular velocity sensor, comprising:

a tuning-fork sensor element formed of piezoelectric material and having two parallel arms extending integrally from a base and electrodes provided on surfaces of the arms, a free end of each arm being formed with an extension projecting outward in a direction of arm vibration (direction of x-axis), wherein the electrodes are provided one each on first surfaces of each arm lying in the direction of vibration (X-Y surfaces) and one each on second surfaces of each arm lying orthogonal to the X-Y surfaces (Y-Z surfaces), and wherein drive electrodes are provided as the electrodes provided one each on the first surfaces and second surfaces of one of each arm and sensor electrodes are provided as the electrodes provided one each on the first surfaces and second surfaces of another arm, the drive electrodes are electrodes for vibrating each arm in phase opposite to each other in a width direction (direction of X axis) of the sensor element, and the sensor electrodes are electrodes for detecting moments which act on each arm as a result of Coriolis force exerted on the extensions depending on the angular velocity when the sensor element is rotated about a rotational axis in a direction of thickness (direction of Z axis).

* * * * *